United States Patent [19]

Katahira

[11] Patent Number: 4,955,244
[45] Date of Patent: Sep. 11, 1990

[54] OPERATING APPARATUS FOR CLEAN ROOM

[75] Inventor: Masayuki Katahira, Maebashi, Japan

[73] Assignee: Nippon Seiko Kabushiki Kaisha, Tokyo, Japan

[21] Appl. No.: 377,597

[22] Filed: Jul. 10, 1989

[30] Foreign Application Priority Data

Jul. 14, 1988 [JP] Japan ................. 63-175843

[51] Int. Cl.$^5$ ................. F16H 25/22; B01D 53/30
[52] U.S. Cl. ................. 74/89.15; 55/270;
55/385.2; 74/424.8 R; 74/459; 98/115.4;
384/15; 384/913
[58] Field of Search ..... 74/89.15, 424.8 R, 424.8 NA,
74/459; 98/115.4; 55/270, 385.2; 384/15, 913

[56] References Cited

U.S. PATENT DOCUMENTS

| | | | |
|---|---|---|---|
| 3,820,627 | 6/1974 | Wirt ................. | 98/115.4 X |
| 4,066,825 | 1/1978 | Eberle ................. | 98/115.4 X |
| 4,530,272 | 7/1985 | Stokes ................. | 55/385.2 X |
| 4,840,077 | 6/1989 | Katahira ................. | 74/424.8 NA |
| 4,859,352 | 8/1989 | Waynick ................. | 252/56 S X |

FOREIGN PATENT DOCUMENTS

62-124324 8/1987 Japan .
62-184277 8/1987 Japan .
609028 5/1978 U.S.S.R. ................. 98/115.4

Primary Examiner—Allan D. Herrmann
Attorney, Agent, or Firm—Basile and Hanlon

[57] ABSTRACT

An operating apparatus includes a ball screw apparatus having a nut secured to a table which is fixed on sliders of a linear guide apparatus. The nut is engaged with a screw shaft and, when the screw shaft is rotated by a driving motor, the table having a member to be driven fixedly mounted thereon is moved together with the nut linearly and horizontally along the screw shaft. The ball screw apparatus and the linear guide apparatus is placed on a clean room, and a dust suction pump located outside the clean room sucks the dust produced in the clean room. Furthermore, a suction pipe of the dust suction pump is connected to a feed oil bore of the nut, which bore has been formed normally beforehand as a feed oil nipple. Thus, the dust produced in the inside of the nut is also sucked out by the dust suction pump. The suction pipe has a spiral portion near the nut. The spiral portion is supported horizontally by a supporting bar which penetrates through the spiral portion to allow the spiral portion to be expanded or compressed with the linear movement of the nut of the ball screw apparatus.

3 Claims, 3 Drawing Sheets

OPERATING APPARATUS FOR CLEAN ROOM

BACKGROUND OF THE INVENTION

1. Field of the Invention

The present invention relates to an operating apparatus for a clean room for operating a member performing a linear movement under a clean environment.

2. Description of the Prior Art

In a precision positioning system such as an XY table or the like used in an exposure apparatus, a wire bonder, a scanner, etc., an operating apparatus comprising a ball screw apparatus and a linear movement guiding mechanism or the like are utilized in order to insure a linear movement or a positioning of a member to be operated with high accuracy. On the other hand, for example, in the fields of semiconductor manufacturing technology or the like in which such a precision positioning system is utilized, the existence of very minute particles having a size equal to or smaller than the order of micrometer causes a problem. Accordingly, the positioning system itself is operated under a clean environment such as a clean room in which the concentration of suspended minute particles is controlled at a predetermined level. However, powders produced by wear, and minute particles of lubricant or the like (hereinafter referred to as dust) are produced from a moving part of an operating apparatus, such as a ball screw apparatus and a linear movement guiding mechanism which constitute a precision positioning system. In order to prevent contamination of a clean environment to be maintained at a predetermined dust level due to the dust produced from the operating apparatus itself, an operating apparatus for a clean room has been required which is provided with a device for sucking and removing dust produced within the operating apparatus.

A prior art duct preventing measure for the moving part of such an operating apparatus as mentioned above is disclosed for example, in Japanese Patent Laid-Open Publication No. 62-184277. In this dust preventing measure, a bearing of a driving rotary shaft (ball screw shaft) and a nut which constitute moving part to be protected against dust are enclosed by a sealing member. A vacuum suction port is formed in the sealing member for evacuating to vacuum the inside space enclosed by the sealing member.

However, in such a prior art dust preventing structure where the moving part is enclosed by a sealing member provided with a vacuum suction port, the dust preventing structure is complicated.

Furthermore, no measure is provided for lubrication of the moving part as is generally employed, not only is the effect of vacuum evacuation degraded, but excessive grease produces dust and becomes a contamination source. Accordingly, in order to reduce the dust, it is necessary to control the amount of the grease attached onto the moving part. On the other hand, if the amount of coating is too small, the durability of the moving part will be degraded and noise will be increased. Moreover, the production of the dust is correlated with the rotation speed of the screw shaft and, even when the amount of coating is decreased, the amount of dust produced will not be decreased straight forwardly.

Furthermore, in order to evacuate the moving part, it is necessary to attach an evacuation tube to the vacuum suction port and to connect the evacuation tube to an evacuation device. In this case, since the moving part must be moved linearly with high accuracy, it is necessary to take into consideration the movement of the evacuation tube following the movement of the moving part.

Moreover, in order to insure the quality of products, it is important to take a measure so that the starting of the operating apparatus is performed only when the level in the clean room is in a prescribed range.

SUMMARY OF THE INVENTION

It is an object of the present invention to provide an operating apparatus for a clean room, which takes vacuum evacuation as well as the supply of lubricant to the operating apparatus into consideration, and which is capable of operating in a highly clean environment with high accuracy irrespective of its simple structure.

In order to achieve the above object, in an operating apparatus for a clean room according to the present invention which includes a ball screw apparatus for linearly moving a member to be operated in a clean environment, and mean for sucking and removing dust produced in the ball screw apparatus, there is provided the improvement in which a suction hose of the sucking and removing means is connected to a feed oil bore formed in a nut which engages a driving rotary shaft of the ball screw apparatus.

In another aspect of the present invention, grease plating is applied to the driving shaft of the ball screw apparatus to suppress the production of dust from the lubricant.

In another aspect of the present invention, a spiral part is formed in the suction hose of the sucking and removing means. The spiral part is supported by supporting means provided in parallel with the driving rotary shaft of the ball screw apparatus so that the movement of the operating apparatus is smooth.

In still another aspect of the present invention, the sucking and removing means is provided with a dust counter for generating a measurement signal corresponding to a dust concentration in the clean environment, and a control device for transmitting an ON/OFF signal in accordance with the level of the dust concentration represented by the measurement signal to thereby start the driving rotary shaft of the ball screw apparatus in response to an ON signal from the control device so that a prescribed clean environment is always maintained.

In the present invention, since a suction hose of the sucking and removing means is connected to a feed oil bore (or oil hole) formed in the nut engaged with the driving rotary shaft of the ball screw apparatus after oil has been fed through the feed oil bore and additional quantities of oil are not required, there is no need to separately provide a suction evacuation hole as in the prior art, and hence the structure is simple.

Furthermore, by applying grease plating on the driving rotary shaft, the production of dust from the lubricant can be suppressed effectively, and the environment in the clean room can be maintained more easily.

Moreover, when the spiral portion of the suction hose of the sucking and removing means is supported by supporting means provided in parallel with the driving rotary shaft of the ball screw apparatus, the suction hose is expanded or compressed in accordance with a linear movement of the operating apparatus so that the movement of the operating apparatus is performed smoothly.

In addition, by always maintaining a prescribed clean environment, and by starting the operation of the rotary shaft of the ball screw apparatus in response to a predetermined level of the dust concentration as determined by the measurement signal, the occurrence of trouble due to dust can be prevented, and the quality of products can be insured.

DESCRIPTION OF THE PREFERRED EMBODIMENT

Figure 1:
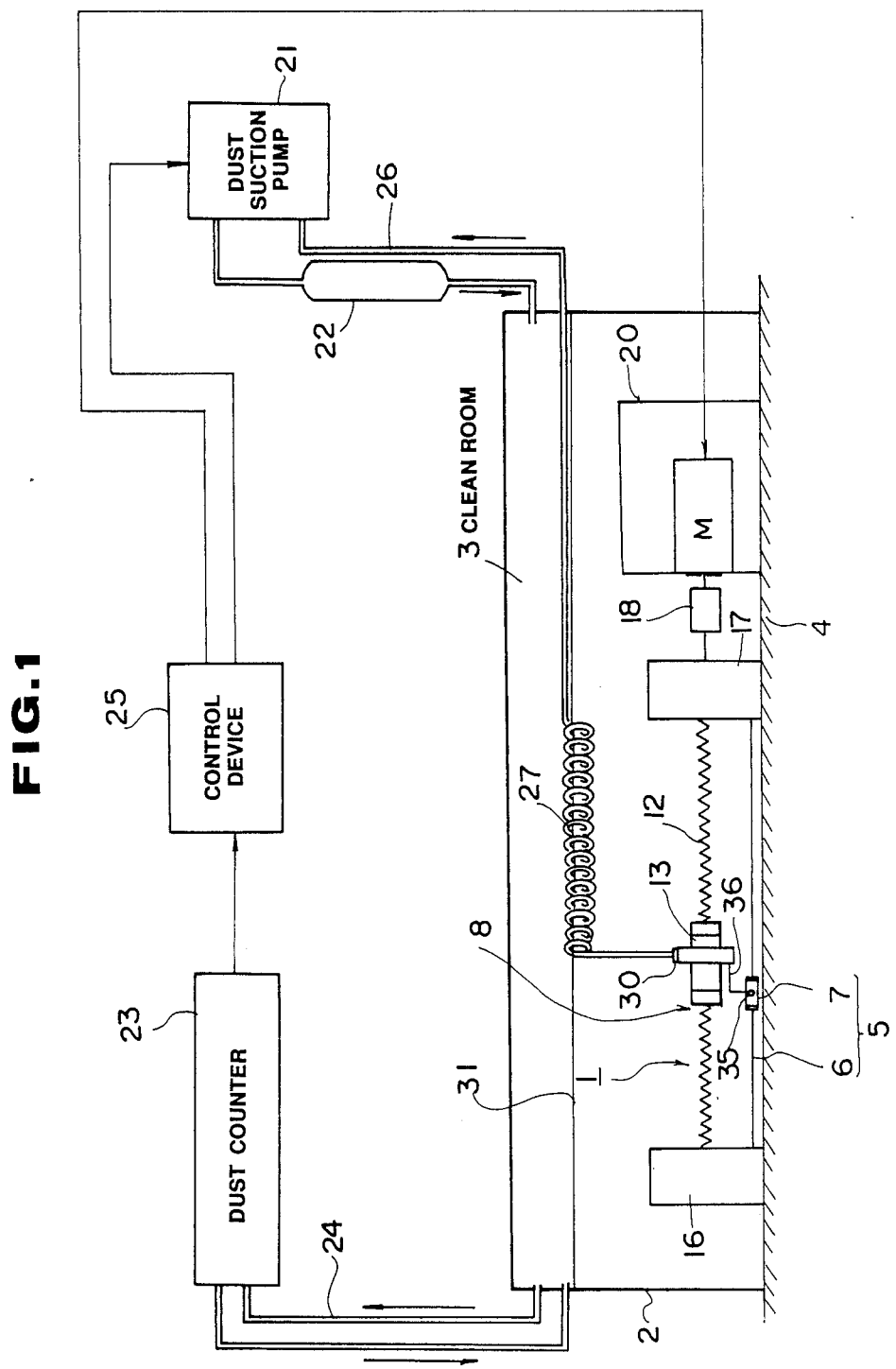
FIG. 1 is a system arrangement diagram of an embodiment of the present invention.
Figure 2:
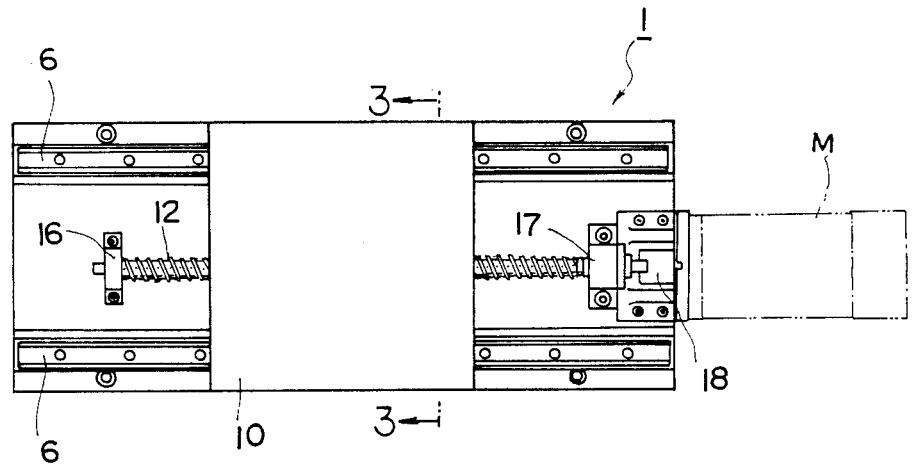
FIG. 2 is a plan view of the single axis precision positioning system shown in FIG. 1.
Figure 3:
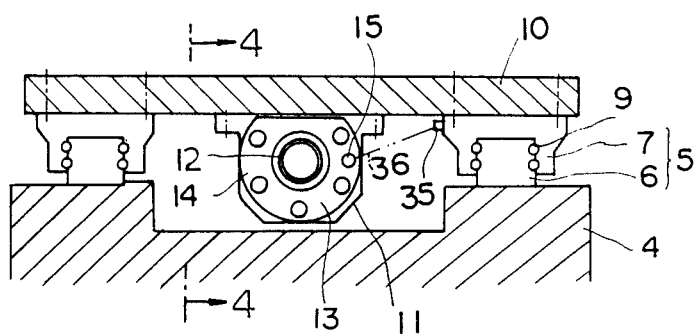
FIG. 3 is a sectional view taken along the line 3—3 in FIG. 2.
Figure 4:
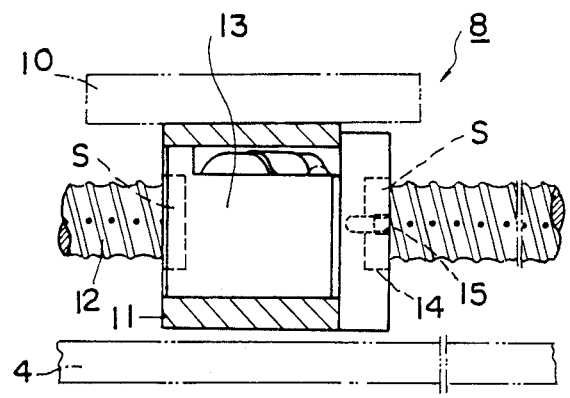
FIG. 4 is a sectional view taken along the line 4—4 in FIG. 3.

FIG. 1 shows a system arrangement of a single axis precision positioning system 1 incorporating a ball screw apparatus which is an operating apparatus for a clean room in an embodiment of the present invention. The single axis precision positioning system 1 is installed in a clean room 3 formed by an outside atmosphere shielding cover 2. The detail structure of the single axis precision positioning system 1 is shown in FIGS. 2 to 4. Guide rails 6 of the two sets of linear guide apparatus 5 are disposed on and secured to a base 4 in parallel to each other. Two sliders 7 are straddling and mounted on each guide 6. Ball rolling grooves having a substantially half circular cross section are respectively formed opposing to each other in the side surfaces of the guide rail 6 and the inner surface of the slider 7. As is well known, the slider 7 can be moved smoothly on the guide rail 6 through rolling and circulating movement of balls in the opposing ball rolling grooves. A table 10 is fixed on upper surfaces of the four sliders 7. A ball nut housing 11 is secured to a lower surface of the table 10 at a center thereof. A nut 13 is attached to the ball nut housing 11. The nut 13 is engaged with a screw shaft 12 which forms a driving rotary shaft of the ball screw apparatus 8. The nut 13 has seal members S made of a plastic and respectively mounted to opposite ends of the nut 13 so that a small gap is formed between each seal member S and an outer surface of the screw shaft 12. Furthermore, a feed oil bore 15 is formed in a surface of a fixing flange 14 of the nut 13. The feed oil bore 15 is formed in advance in a standard manner, and a female thread is formed therein to attach a feed oil nipple 30 thereinto. The feed oil hole 15 is in communication with a ball groove in an inner surface of the nut 13. Opposite ends of the screw shaft 12 are respectively supported by supports 16 and 17 through ball bearings. Furthermore, one end of the screw shaft 12 is connected to a driving motor M through a coupling 18. The driving motor M is covered by a dust production preventing cover 20, and the dust produced by a moving portion of the driving motor M is prevented from scattering into the clean room 3. A magnetic fluid may be used as a shaft seal of the driving motor M and as a shaft seal at a bearing portion of the screw shaft 12.

Outside the clean room 3, there is installed a dust suction pump 21 as a means for sucking the dust from the clean room. An air filter 22 having a predetermined filtering accuracy is provided at a discharge side of the dust suction pump 21, and air filtered by the air filter 22 is circulated into the clean room 3. The reference numeral 23 designates a dust counter for measuring a dust concentration in the clean room 3. The dust counter 23 samples and filter the air in the clean room 3 through a suction tube 24 and counts the number of dust particles in the samples air. The dust counter 23 transmits an ON signal when the measured amount of dust particles is equal to or less than a prescribed value. Numeral 25 designates a control device for controlling the starting and stopping of the driving motor M for rotating the screw shaft 12, and the dust suction pump 21. When the ON signal is received by the control device 25, a start signal for the screw shaft 12 is transmitted. Furthermore, when the driving movement of the screw shaft 12 is stopped, a stop signal for the dust suction pump 21 is transmitted after a predetermined time elapses.

An end portion of a suction pipe 26 of the dust suction pump 21 is formed as a flexible spiral tube 27. The spiral tube 27 is connected through the nipple 30 to the feed oil bore 15 of the nut 13 which is engaged with the screw shaft 12 of the ball screw apparatus 8 after oil has been fed through the feed oil bore 15 and additional quantities of oil are not required.

The spiral portion of the spiral tube 27 is supported by a supporting bar 31 which passes through the spiral portion and which extends in parallel with the screw shaft 12 of the ball screw apparatus 8.

A suction port 35 is formed in the slider 7 of the linear guide apparatus 5 as a connection port of the sucking and removing means. The suction port 35 is in communication with a gap space between the slider 7 and the guide rail 6, and is connected to a branch tube 36 from the spiral tube 27.

A grease plating treatment is applied to the guide rail 6 and the screw shaft 12 of the precision positioning system 1. In this treatment, the object to be treated is dipped into a solution which contains a lubricant, such as lithium soap base grease dissolved in a high volatile solvent including benzine, alcohol, or the like, and, after the object to be treated is taken out, it is dried for a short time thereby to form a thin coating of the lubricant on the surface of the object to be treated.

Next, the operation of the operating apparatus for a clean room arranged as described above will be set forth.

In starting the precision positioning system 1, the dust suction pump 21 is operated in advance by an instruction from the control device 25. At the same time, measurement of the dust level in the clean room 3 is commenced by the dust counter 23. As a result of this measurement, when the number of minute particles having a size not smaller than a predetermined size in the air sucked for a predetermined volume is less than a predetermined number, an ON signal is transmitted to the control device 25 from the dust counter 23. Upon receiving the ON signal, the control device 25 transmits a start instruction to the driving motor M of the screw shaft 12. Consequently, the table 10 having the nut 13 built therein is moved linearly in the axial direction by being guided by the linear guide apparatus 5.

Because of the driving of the linear guide apparatus 5 within the nut 13, dust is produced primarily due to the rolling of the balls 9. However, since the dust suction pump 21 is operating, surrounding air flows into the inside of the nut 13 through the gap between the screw shaft 12 and the nut 13. Then the air accompanied by the dust produced within the nut 13 is sucked by the dust suction pump 21 through the spiral tube 27 and the suction pipe 26. The sucked dust is filtered by the air filter 22, and cleaned air is circulated into the clean room 3.

In this manner, it is possible to fully prevent the dust produced in the nut 13 from flowing into the clean room 3.

Furthermore, in the linear guide apparatus 5, the air which flows into the slider 7 through the gap between the guide rail 6 and the slider 7 is accompanied by the produced dust, and is sucked by the dust suction pump 21 from the suction port 35 formed in the slider 7 through the branch tube 36 and the spiral tube 27. Thus, the dust is removed similarly.

Figure 5:
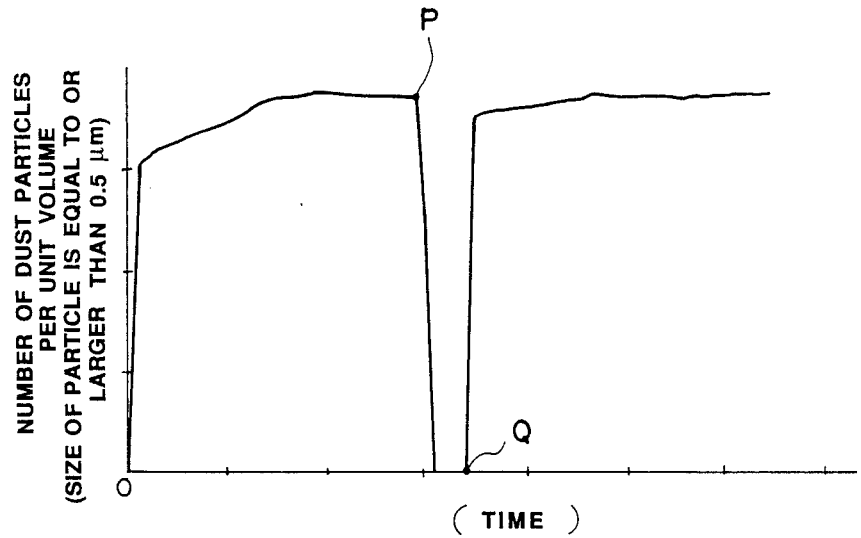
FIG. 5 is a graph illustrating a change in dust level depending on an operating condition of the apparatus shown in FIG. 1.

The graph in FIG. 5 shows an example of experimental data. The ordinate represents the number of dust particles, which are equal to or larger than 0.5 micrometer, per unit volume of sucked air, or a dust particle level per unit volume. The abscissa represents an operation time of the apparatus. First, the clean room 3 is in a condition in which the dust particle number is "0". The operation of the precision positioning system 1 is started while maintaining the dust suction pump 21 off. During such operation, a change in dust particle level in the clean room 3 is recorded at the time when the dust suction pump 21 is ON-OFF controlled.

The dust particle level rises rapidly with the start of the operation without suction and is saturated at a high level after ten and several hours. When the dust suction pump 21 is started into operation at a point P, the dust particle level is lowered rapidly and becomes 0 in about 2 hours. During the operation of the dust suction pump 21, a dust particle level 0 is maintained. When the dust suction pump 21 is stopped at a point Q, the dust particle level rises instantly, and again reaches the high level.

From the data mentioned above, it will be apparent that a significant effect of dust contamination prevention can be achieved due to a synergistic action of the dust suction means and the lubrication means in the embodiment of the present invention.

In the embodiment, since the suction pipe 26 of sucking and removing means is connected by the feed oil bore 15 which has been provided beforehand, there is not need to separately form a suction and evacuation hole in the nut 13. Thus, the structure can be made simple.

Furthermore, by applying the grease plating on the screw shaft 12 and the guide rail 6 of the linear guide apparatus 5, the production of dust from the lubricant can be suppressed effectively, and the suction of the dust is not disturbed by the grease coated on the whole surface. As a result, the dust level of the clean room can be maintained at a predetermined level easily due to the application of the grease plating and the provision of the sucking means.

Moreover, since the spiral tube 27 of the dust suction pump 21 is supported by the support bar 31 in parallel with the screw shaft 12 of the ball screw apparatus 8, the spiral tube 27 is expanded or compressed in accordance with a linear movement of the nut 13 such that movement of the nut 13 is not disturbed.

Furthermore, when the movement of the screw shaft 12 of the ball screw apparatus 8 is started in accordance with a level of the dust concentration generating the measurement signal of the dust counter 23, a prescribed clean environment can always be maintained, and the occurrence of trouble due to the dust can be prevented.

While it is not shown in FIG. 1, moving portions of bearings of the supports 16 and 17 for supporting the screw shaft 12, and bearing moving portions of the driving motor M and the like may be connected to the dust suction pump 21.

As described in the foregoing, owing to the arrangement in the present invention, the following advantages are provided.

Since the dust sucking and removing means is connected to the ball screw apparatus by utilizing a feed oil bore which is generally provided in the nut of the ball screw apparatus, there is no need to form a separate suction and evacuation hole. Thus, the structure is simple.

Furthermore, by applying grease plating on the driving rotary shaft, the production of dust from the lubricant can be suppressed effectively. As a result, the environment in the clean room can easily be maintained.

Moreover, by supporting a spiral portion of a suction pipe of the suction and removing means by supporting means provided in parallel to the driving rotary shaft, the linear movement of the suction pipe, and hence, the movement of the nut can be smoothly performed.

In addition, by starting the ball screw apparatus in accordance with a dust concentration signal from the dust counter, a prescribed clean environment can always be maintained, and the occurrence of trouble due to the dust can be prevented.

What is claimed is:

1. In an operating apparatus for a clean room including a ball screw apparatus having a nut which is engaged with a driving rotary shaft of the ball screw apparatus for linearly moving a member to be operated in a clean environment, and means for sucking and removing dust produced in said ball screw apparatus, the improvement comprising:
   a feed oil bore formed in the nut;
   said sucking and removing means including a suction pipe connected to the feed oil bore; and wherein
   grease plating is applied to the rotary shaft of said ball screw apparatus by dipping the rotary shaft into a solution of a volatile solvent containing a very small amount of grease dissolved therein and by drying the rotary shaft after removing the rotary shaft from the solution to thereby form a very thin coating of the grease on the surface of the rotary shaft.

2. In an operating apparatus for a clean room including a ball screw apparatus having a nut which engaged with a driving rotary shaft of the ball screw apparatus for linearly moving a member to be operated in a clean environment, a linear guide apparatus having a guide rail for supporting and guiding said ball screw apparatus, and means for sucking and removing dust produced in said ball screw apparatus, the improvement comprising:
   a feed oil bore formed in the nut;
   said sucking and removing means including a suction pipe connected to the feed oil bore; and wherein
   grease plating is applied to the guide rail of said linear guide apparatus by dipping the guide rail into a solution of a volatile solvent containing a very small amount of grease dissolved therein and by drying the guide rail after removing the guide rail from the solution to thereby form a very thin coating of the grease on the surface of the guide rail.

3. In an operating apparatus for a clean room including a ball screw apparatus having a nut which in engaged with a driving rotary shaft of the ball screw apparatus for linearly moving a member to be operated in a clean environment, and means for sucking and removing dust produced in said ball screw apparatus, the improvement comprising:

a feed oil bore formed in the nut;

said sucking and removing means including a suction pipe connected to the feed oil bore; and said sucking and removing means includes a dust counter for transmitting a measurement signal indicative of a dust concentration in said clean environment, and a control device for transmitting an ON/OFF signal in accordance with a predetermined level of the measurement signal of the dust concentration from said dust counter, and wherein the operation of said driving shaft of said ball screw apparatus is started by an ON signal from said control device.

* * * * *